United States Patent
Petersen

(10) Patent No.: US 7,429,168 B2
(45) Date of Patent: Sep. 30, 2008

(54) OVEN PROTECTION SYSTEM FOR A THERMO-FORMING MACHINE

(76) Inventor: Albert O. Petersen, 1120 Shaw Rd., Gladwin, MI (US) 48624

( * ) Notice: Subject to any disclaimer, the term of this patent is extended or adjusted under 35 U.S.C. 154(b) by 25 days.

(21) Appl. No.: 11/514,755

(22) Filed: Sep. 1, 2006

(65) Prior Publication Data

US 2008/0057149 A1    Mar. 6, 2008

(51) Int. Cl.
  *B29C 51/42*    (2006.01)
(52) U.S. Cl. .................. 425/135; 425/151; 425/384; 432/42; 432/194; 432/253
(58) Field of Classification Search ............. 425/384, 425/135, 151; 432/42, 194, 253
  See application file for complete search history.

(56) References Cited

U.S. PATENT DOCUMENTS

| | | | |
|---|---|---|---|
| 2,907,069 A | 10/1959 | Butzko | 269/25 |
| 3,287,765 A | 11/1966 | Puente | 269/237 |
| 3,348,265 A * | 10/1967 | King et al. | 425/214 |
| 3,535,739 A * | 10/1970 | Mehnert | 425/168 |
| 3,732,047 A * | 5/1973 | Kostur | 425/144 |
| 3,829,264 A * | 8/1974 | Mnilk et al. | 425/19 |
| 3,914,103 A | 10/1975 | Dean et al. | 425/397 |
| 4,018,551 A | 4/1977 | Shuman | 425/388 |
| 4,097,035 A | 6/1978 | Shuman | 269/121 |
| 4,099,901 A | 7/1978 | Shuman | 425/388 |
| 4,170,449 A | 10/1979 | Shuman | 425/445 |
| 4,181,558 A * | 1/1980 | Neubronner | 156/355 |
| 4,332,552 A | 6/1982 | Seelandt | 432/209 |
| 4,674,972 A | 6/1987 | Wagner | 425/388 |
| 4,878,826 A | 11/1989 | Wendt | 425/384 |
| 4,938,678 A | 7/1990 | Oulman | 425/397 |
| 5,469,461 A | 11/1995 | Andrea | 373/156 |
| 5,524,697 A | 6/1996 | Cook | 164/97 |
| 5,562,933 A | 10/1996 | Shuman | 425/388 |
| 5,773,540 A | 6/1998 | Irwin et al. | 425/387.1 |
| 5,847,961 A | 12/1998 | Jones et al. | 364/477.01 |
| 5,900,034 A | 5/1999 | Mumford et al. | 65/171 |
| 6,361,304 B1 | 3/2002 | Petersen | 425/193 |
| 6,582,562 B2 | 6/2003 | Gale et al. | 162/382 |
| 6,589,041 B2 | 7/2003 | Feil | 425/387.1 |
| 6,746,229 B2 | 6/2004 | Wei Chang | 425/193 |
| 2001/0002200 A1 | 5/2001 | Stanley | 373/153 |

* cited by examiner

*Primary Examiner*—Robert B Davis
(74) *Attorney, Agent, or Firm*—Bliss McGlynn, P.C.

(57) ABSTRACT

An oven protection system for a thermo-forming machine having a source of heat for heating a workpiece. The oven protection system includes a barrier that is movable from a stored position to a deployed position between the source of heat and the workpiece in response to a predetermined condition.

18 Claims, 6 Drawing Sheets

OVEN PROTECTION SYSTEM FOR A THERMO-FORMING MACHINE

BACKGROUND OF THE INVENTION

1. Field of the Invention

The present invention relates, generally, to thermo-forming machines, and more specifically, to an oven protection system for thermo-forming machines.

2. Description of the Related Art

Thermo-forming machines are used in the manufacture of contoured plastic articles and the like. Machines of this type typically include a source of heat, such as an infrared or convection oven, and a mold. Thus, the ovens may be either gas fired or electric. A plastic, sheet-like work piece is cycled between the oven, where it is heated until it has become plasticized, and the mold where the work piece is formed into a desired shape. The mold may include at least one die and a pre-draw box, pressure plate or match tooling. The mold may thus be vacuum actuated, use air assisted pressure or simple mechanical force, as with match tooling, to form the plastic part. In the case of vacuum actuated molds, the die usually has a perforated surface. A vacuum is applied to this surface through the perforations which draws the heated sheet into contact with the surface of the die thereby imparting the shape of the die to the work piece. The newly formed plastic article is allowed to cool and is removed from the machine. The process is then repeated.

A clamp frame is typically used to secure the sheet-like workpiece in the machine, advance the work piece into the oven until it has become sufficiently plasticized and then to position the heated work piece adjacent the perforated die for molding. Clamp frames typically include a pair of opposed longitudinal frame members as well as a pair of opposed transverse frame members. Each frame member may include one or more clamps used to fix the workpiece relative to the machine.

A screen or other mesh-like material is typically disposed directly above the heating elements of the oven of the thermo-forming machine and beneath the clamp frame to which the workpiece is mounted. Thus, the screen essentially defines the upper portion of the oven. The screen is usually made of some sort of metallic material and because of its proximity to the heating elements, it generally becomes very hot during thermo-forming operations.

In one type of thermo-forming process, a workpiece may be heated to a predetermined temperature in the oven while another is being formed in a mold. In some processes, a final product is being removed from the clamp frame and another workpiece is mounted in the clamp frame while two other workpieces are in process. Thus, once the final product has been removed, a new workpiece is mounted in the clamp frame and is cycled back to the oven. Movement of the workpiece between stations occurs simultaneously. None of the workpieces may be moved until each station is ready to accept it. Alternatively, it is also known in the related art to employ thermo-forming processes having single, double, or any number of stages. Accordingly, those having ordinary skill in the art will appreciate from the description that follows that the present invention is in no way limited to the type of thermo-forming process employed.

During any given thermo-forming process, it is possible that a workpiece may take more time in the mold to form and set up or the operator may take more time than anticipated to remove a final product from the clamp frame and to mount a new workpiece in the clamp frame. In any one of these exemplary situations, the operator may then stop the machine's cycle, for example by pressing an emergency stop button or switch (commonly known as an "E-stop" in the related art). Alternatively, a power outage, mechanical failure, or operator error may interrupt the cycling operation of the thermo-forming machine. In any one of these instances or the like, it is possible that a workpiece may be disposed above the oven for a period that is longer than is necessary to sufficiently plasticize it in preparation for the molding stage of the operational cycle. In this event, the workpiece can essentially melt to the point that it sags downwardly into contact with the hot screen or mesh disposed just above the heating elements of the oven. This causes the workpiece to further melt such that the now melting workpiece drips down into the heating elements of the oven.

When the melting workpiece comes into contact with the screen, heating elements, or other very hot portions of the oven, it can produce smoke, fire, and noxious fumes that may spread throughout the enclosure in which the thermo-forming machine resides. This may cause a shut-down of the factory. If a fire erupts, many of the sensitive components of the thermo-forming machine are destroyed or damaged and must be replaced if the machine is salvageable. The fire can spread to other machines or the factory enclosure itself resulting in catastrophic damage. Even in the absence of a fire, the resulting maintenance that must be performed on the oven to clean the plasticized workpiece material from the heating elements and the associated down time for this effort results in significant costs and a loss of productivity.

In view of these circumstances, it is known in the related art to provide fire suppression systems associated with the thermo-forming machine that typically include fire extinguishers and the like. These devices are triggered in the event of a fire starting in the oven to put it out. Unfortunately, while such systems may save the machine and/or the factory from catastrophic devastation, they do not prevent fires in the first place. In addition, because of the chemicals used in modern fire-extinguishing systems, the thermo-forming machine and oven, in general, and the heating elements specifically, must be thoroughly cleaned before operations may be resumed on that machine. This takes time, labor, and still results in a significant loss of productivity.

Accordingly, there remains a need in the art for a system that allows normal cycling procedures in a thermo-forming machine to occur unimpeded but that prevent a workpiece from coming into contact with the oven of the thermo-forming machine when, for example, it becomes overly plasticized.

SUMMARY OF THE INVENTION

The present invention overcomes the deficiencies of the related art in an oven protection system for a thermo-forming machine that has a source of heat for heating a workpiece. The oven protection system includes a barrier that is movable from a stored position to a deployed position between the source of heat and the workpiece in response to a predetermined condition. In this way, the oven protection system of the present invention allows normal cycling procedures in a thermo-forming machine to occur unimpeded. At the same time, the oven protection system of the present invention prevents the workpiece from coming into contact with the oven of the thermo-forming machine when, for example, it becomes overly plasticized.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
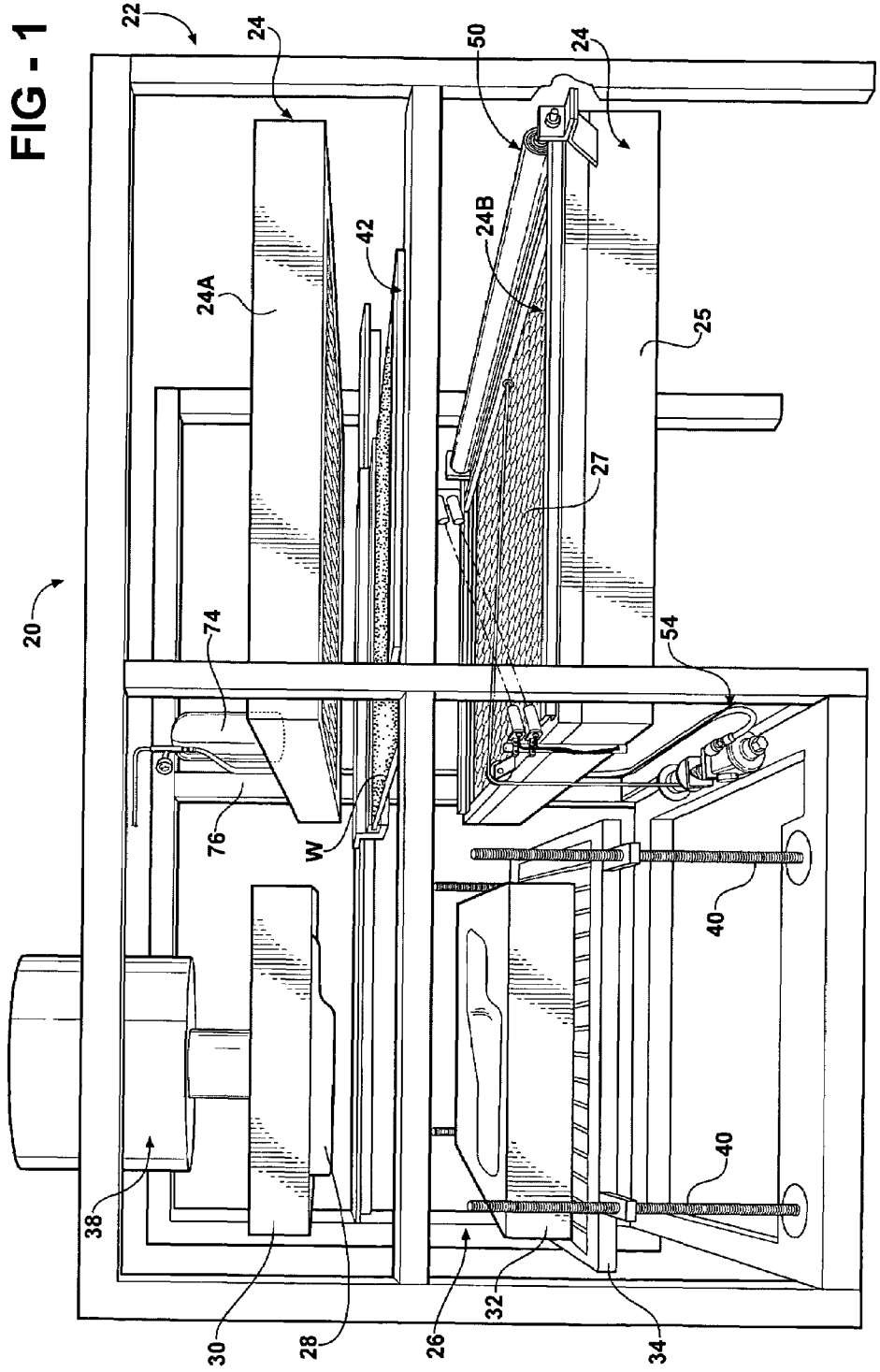
FIG. 1 is a side perspective view of one embodiment of a thermo-forming machine.

One representative example of a thermo-forming machine is generally indicated at 20 in FIG. 1. The thermo-forming machine 20 illustrated in this figure is conventional in many respects in that it includes a main superstructure, generally indicated at 22, which supports a source of heat, such as a convection or infrared oven, generally indicated at 24, and a mold assembly, generally indicated at 26. Thus, the oven may be gas-fired, electric or may use any other suitable source of heat of the type commonly known in the related art. In the representative example illustrated in FIG. 1, the oven 24 may include upper and lower sections 24A, 24B, respectively, that are employed to heat and ultimately plasticize the workpiece W. Each upper and lower sections 24A and 24B include a housing 25 in which is supported a plurality of heating elements. A screen 27 forms the upper portion of the lower oven section 24B. The thermo-forming machine 20 illustrated in FIG. 1 has a double-ended, shuttle-type configuration. However, those having ordinary skill in the art will appreciate that the machine may have a turntable with multiple stations, a single station, a single oven, or any other type of configuration known in the art without departing from the scope of the present invention.

A plastic, sheet-like workpiece W is cycled between the oven 24, where it is heated until it has become plasticized, and the mold assembly, generally indicated at 26, where the workpiece is formed into a desired shape. The mold assembly 26 may include any combination of elements capable of imparting a shape to the plasticized workpiece W. Thus, the mold assembly 26 may include a die, pre-draw box, pressure plate or match tooling. The mold assembly 26 may also be vacuum actuated, use air assisted pressure, or in the case of match tooling, use simple mechanical force. In the embodiment illustrated herein, the mold assembly 26 is vacuum actuated and employs an upper die 28 mounted to an upper platen, generally indicated at 30. A lower mold member 32 is mounted to the lower platen, generally indicated at 34.

In the embodiment illustrated in FIG. 1, the upper and lower platens 30, 34 are movable toward and away from one another to bring the mold halves together and in abutting contact with a workpiece W. Those having ordinary skill in the art will appreciate that this rectilinear movement may be imparted by many different means commonly known in the art. For example, as illustrated with respect to the upper platen 30, it may be moved using hydro-mechanical means, such as a hydraulically powered piston/cylinder arrangement, generally indicated at 38, or electro-mechanical means, such as illustrated in connection with the lower platen 34 where four electrically powered, upstanding racks 40 are employed to movably support the lower platen 34. However, those having ordinary skill in the art will appreciate that the upper and lower platens 30, 34 may be actuated toward and away from one another using manual, mechanical, hydro-mechanical, or electro-mechanical means of any type commonly known in the art. Accordingly, it will be appreciated that the present invention is in no way limited to the particular mechanism illustrated in the figures.

The thermo-forming machine 20 also includes a clamp frame, generally and schematically indicated at 42, which secures the workpiece in a predetermined orientation relative to the oven 24 and mold assembly 26. Furthermore, the clamp frame 42 is indexable so as to position the workpiece opposite the oven 24, thereby heating it until plasticized. The clamp frame 42 is also indexable to position the plasticized workpiece between the upper die 28 and lower mold member 32. Thus, the clamp frame 42 and the workpiece W supported therein are movable from the oven stage of the thermo-forming machine where the workpiece is plasticized to the mold stage of the thermo-forming machine. The die 28 and mold member 32 are brought into mating engagement as the upper and lower platens 30, 34 are moved toward one another thereby imparting a contoured shape to the workpiece W. At the same time, and in the case of a vacuum-actuated die, the workpiece W is drawn toward the surface of the die. The newly formed part is allowed to "set up" or cool, the part is removed from the machine and the process is repeated. However, and as noted above, the thermo-forming machine illustrated in FIG. 1 is simply one of many known types of arrangements commonly known in the art. Accordingly, and from the description that follows, those having ordinary skill in the art will appreciate that the oven protection system of the present invention may be employed in connection with all types of thermo-forming machines commonly known in the art. Similarly, the clamp frame 42 may be of any type commonly known in the art. For example, the clamp frame 42 may be of the type described in U.S. Pat. No. 6,361,304 B1 entitled "Adjustable Clamp Frame for a Thermo-Forming Machine" issued Mar. 26, 2002, the disclosure of which is incorporated herein by reference. However, those having ordinary skill in the art will further appreciate that the present invention is in no way limited to the particular mechanics of the clamp frame employed in the thermo-forming machine.

Figure 2:
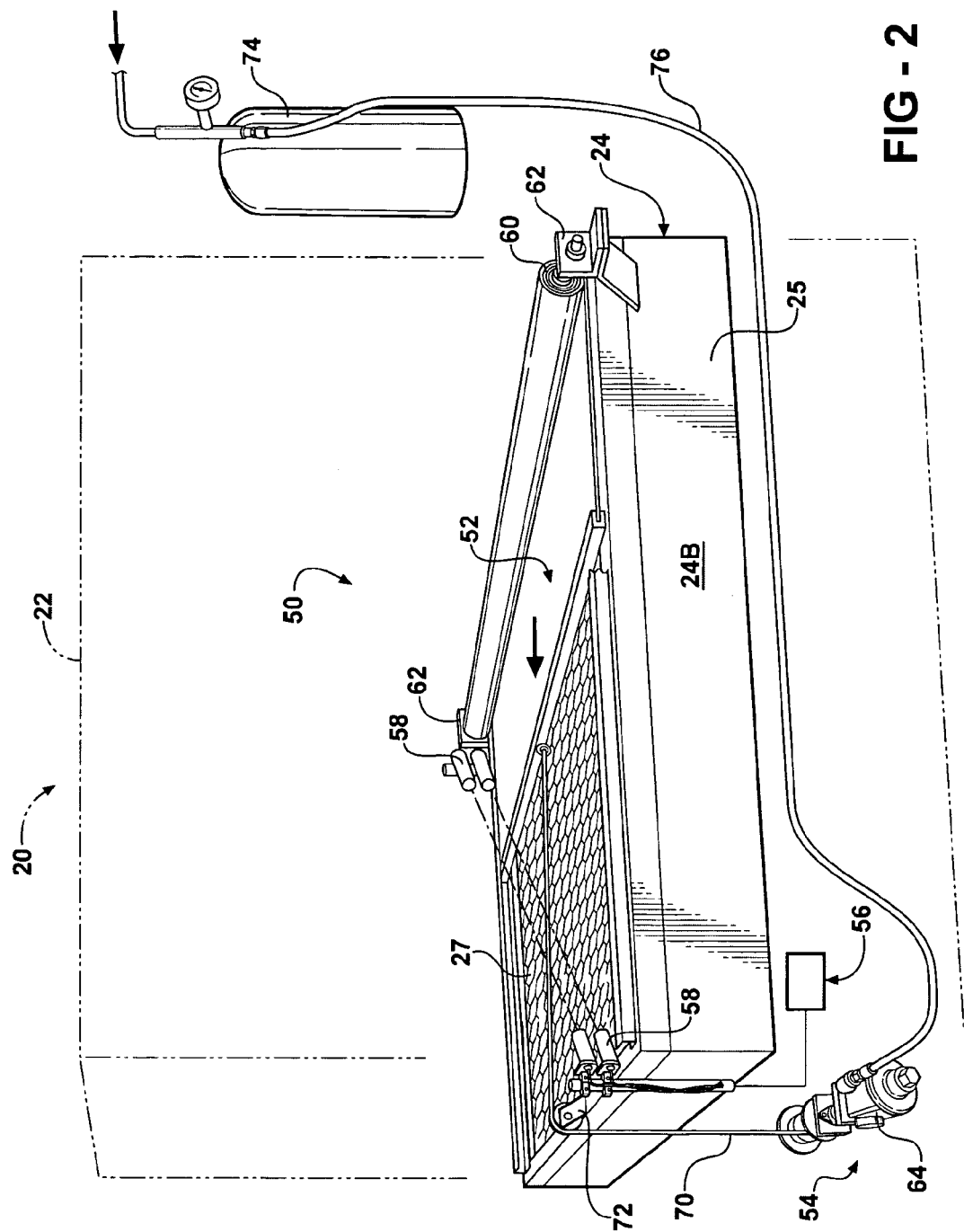
FIG. 2 is a perspective view of the oven protection system of the present invention.
Figure 3:
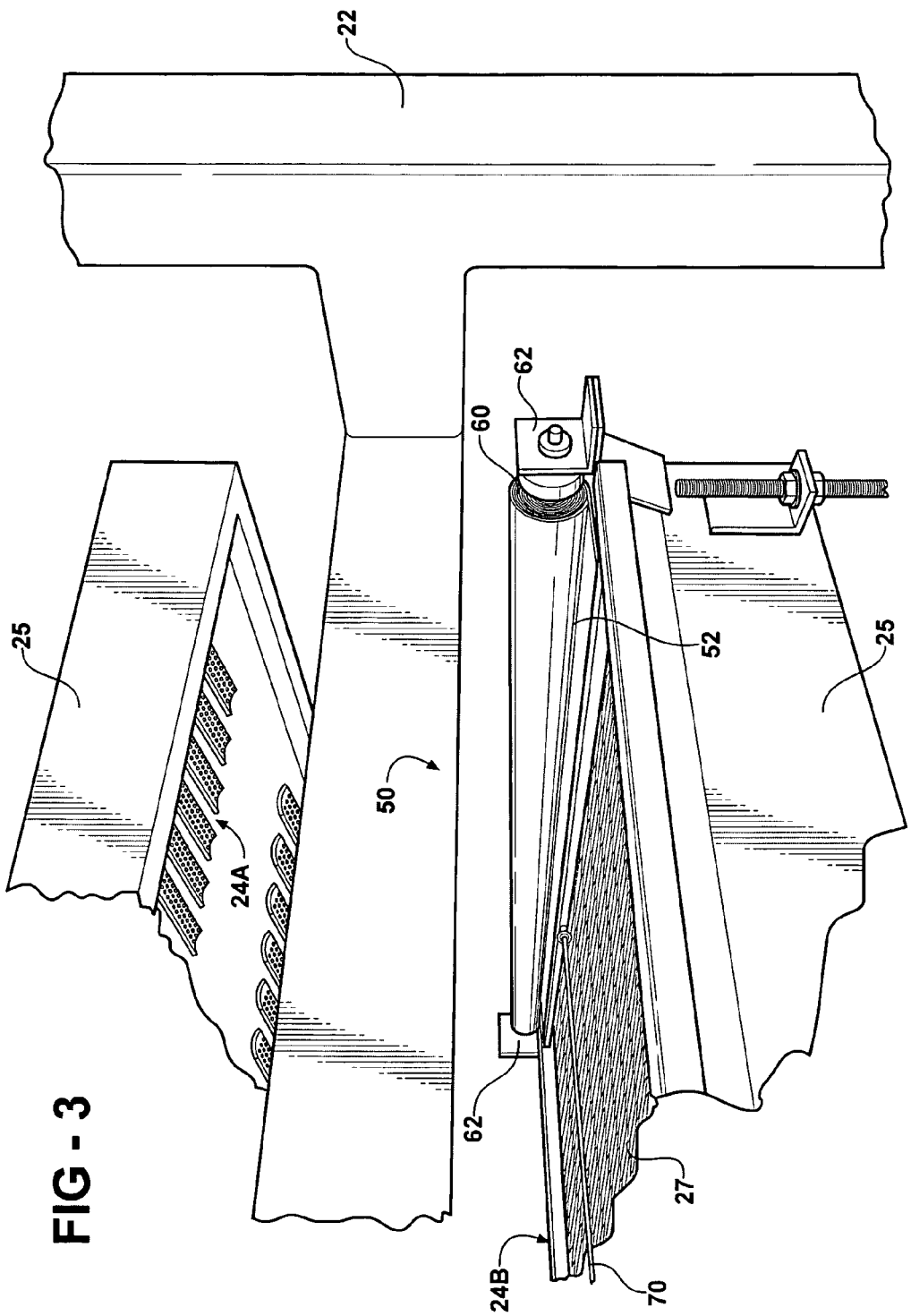
FIG. 3 is a partial perspective view of the oven protection system of the present invention mounted in a thermo-forming machine.
Figure 4:
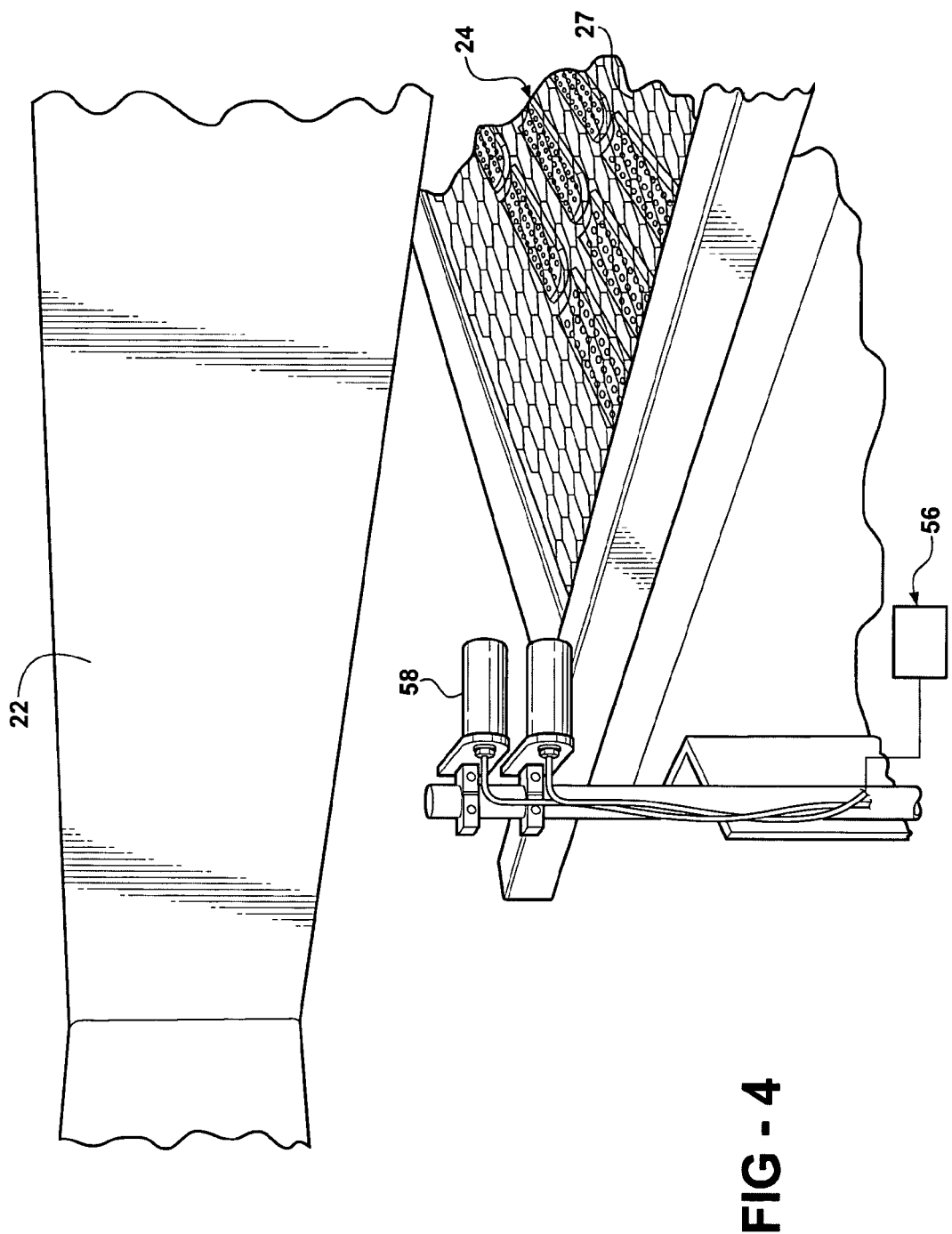
FIG. 4 is a partial perspective view illustrating one embodiment of a sensor of the oven protection system of the present invention.

The present invention also includes an oven protection system, generally indicated at 50 in FIG. 2 and shown in its operative environment in FIG. 1 and partially in FIGS. 3 and 4. Referring now specifically to FIG. 2, the oven protection system 50 of the present invention includes a barrier, generally indicated at 52. The barrier 52 is movable from a stored position, illustrated in FIG. 1, to a deployed position between at least one source of heat and the workpiece W in response to a predetermined condition. In this context, the barrier 52 is shown in FIG. 2 as it is being moved between its respective stored and deployed positions. The oven protection system may also include a prime mover, generally indicated at 54 in FIG. 2, operatively connected to the barrier 52 and adapted to move the barrier from its stored to its deployed position. In addition, the oven protection system may include a controller, schematically illustrated at 56 in FIG. 2 and at least one sensor 58 that is operatively mounted to the thermo-forming machine 20 and adapted to sense a predetermined condition and to send a signal to the controller 56. The predetermined condition may include the situation where the workpiece W becomes overly plasticized and then sags downwardly toward the oven screen 25. As noted above, the oven screen 27 forms the upper portion of the housing 25 that encloses the lower section 24B of the oven 24. If the workpiece W becomes overly plasticized, it will trigger the sensors 58 which sends a signal to the controller 56. The controller 56 is operable to actuate the prime mover 54 to move the barrier 52 from the stored position to the deployed position. In one embodiment illustrated in the figures, the sensor 58 is a photoelectric sensor adapted to sense when the workpiece has become overly plasticized in response to heat from the oven. However, those having ordinary skill in the art will appreciate that the predetermined condition that triggers actuation of the barrier 52 may also include an emergency stop command issued by the operator, a power outage, mechanical failure, or operator error. Thus, the sensor may be of any type that senses the interruption of the cycling operation of the thermo-forming machine 20. In this way, the barrier 52 prevents the melting workpiece from coming into contact with the screen 25 or any other component of the source of heat, in this case the oven 24. Each of the components of the oven protection system discussed above will now be described in detail.

Referring now specifically to FIGS. 2 and 3, one embodiment of the barrier 52 of the present invention includes a flexible material disposed upon a roll 60 in the stored position laterally spaced and slightly above relative to the lower section 24B of the oven 24. The barrier 52 extends in a sheet-like fashion when disposed in the deployed position between the oven 24 and workpiece W. For purposes of description, and not by way of limitation, the applicant has chosen a sheet of foil-faced fiber glass to serve as the flexible material that forms the barrier 52 of the present invention. However, those having ordinary skill in the art will appreciate that the present invention is in no way limited to the specific material employed to form the barrier in this case. Thus, the barrier 52 may be comprised of any suitable material which serves to prevent the workpiece W from coming in contact with the oven. Some examples of suitable alternative materials which may serve as a barrier 52 include, but are not limited to all types of metals, Fiberglass, Teflon, Nomex, Calcium-Silicate etc. Indeed, those having ordinary skill in the art will appreciate that the number of suitable alternative materials is quite large and it is not practical to attempt to list them all here.

The roll of flexible material is supported between a pair of opposed flanges 62 mounted, for example, at one side of the housing that defines the lower section 24B of the oven 24. However, it should be understood that the barrier 52 can be mounted to any portion of the thermo-forming machine 20 that allows it to be deployed between the workpiece W and the oven 24 in the event of the predetermined conditions mentioned above. Alternatively, and in addition to the barrier 52 disposed above the lower section 24B of the oven 24, the oven protection system 50 of the present invention may further include a second barrier that may be deployed between the upper section 24A of the oven 24 and the workpiece W. Thus, the oven protection system 50 of the present invention contemplates any number of barriers 52 necessary to adequately prevent the workpiece W from melting to the point that it generates smoke, fire, noxious fumes, or any other unacceptable products of combustion.

Figure 5:
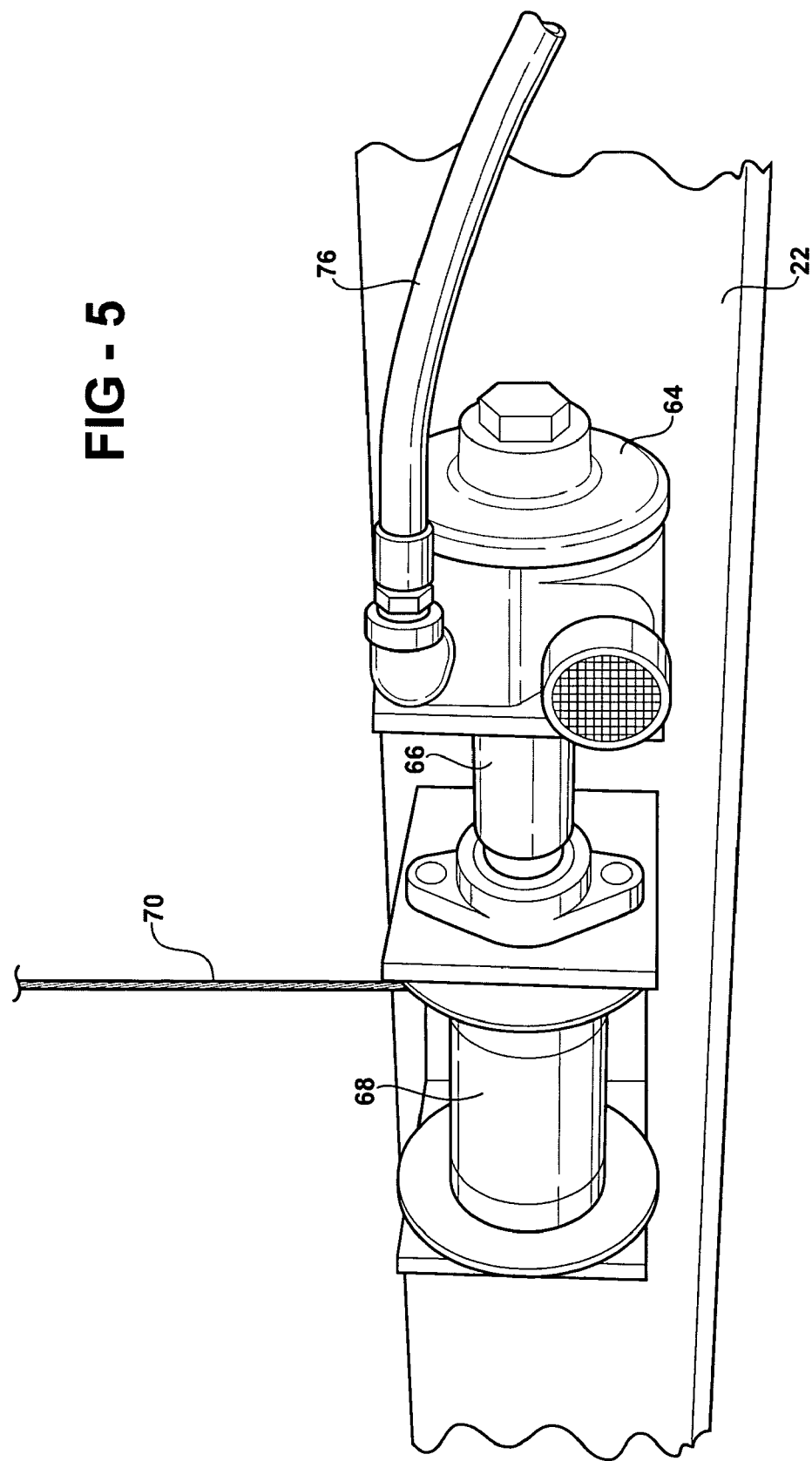
FIG. 5 is a partial perspective view of one embodiment of the prime mover that powers the barrier of the oven protection system of the present invention.

As best shown in FIG. 5, the prime mover 54 may include a motor 64 having an output 66 and a spindle 68 operatively connected to the motor 64. The motor 64 is operable to drive the spindle 68. In the representative embodiment illustrated herein, the prime mover 54 includes a cable 70 that is operatively connected between the spindle 68 and the barrier 52. The cable 70 is adapted to be wound about the spindle 68 to move the barrier 52 from its stored to its deployed positions as the motor 64 drives the spindle 68. To this end, the oven protection system may also employ a pulley 72 (FIG. 2) disposed between the spindle 68 and the barrier 52. In this case, the cable 70 may be entrained about the pulley 72. However, those having ordinary skill in the art will appreciate that the barrier 52 may be interconnected with the motor 64 using any suitable means.

Figure 6:
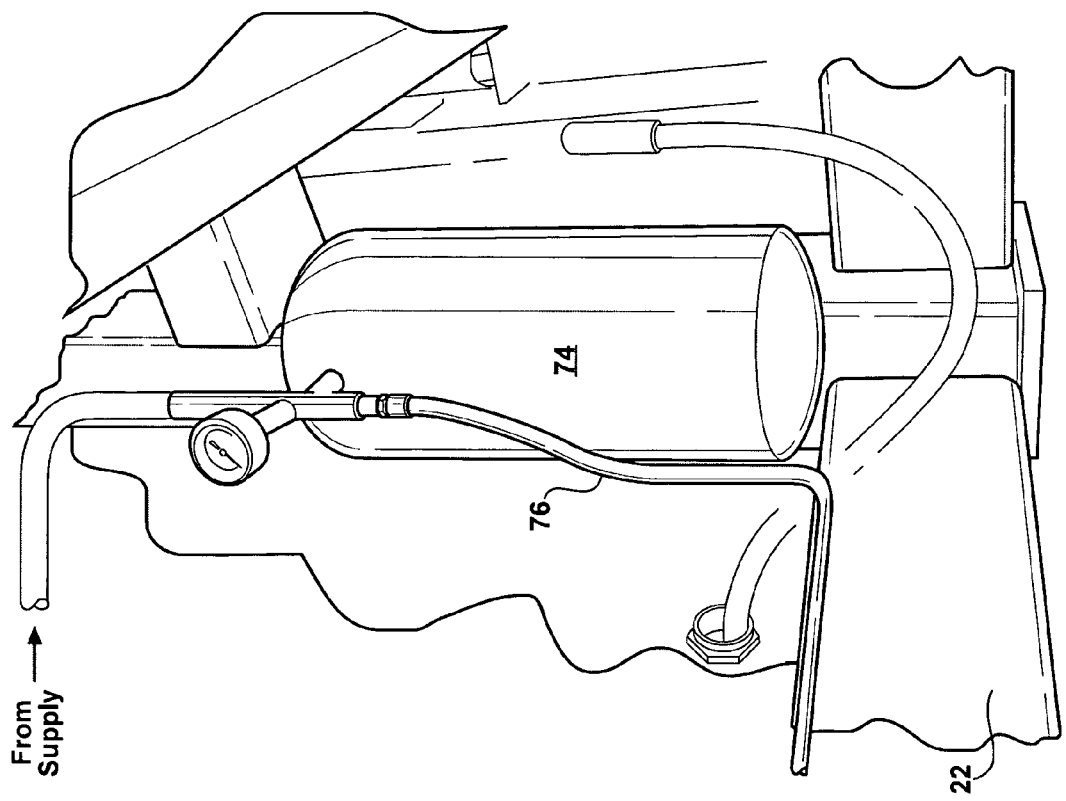
FIG. 6 is a partial perspective view of one embodiment of the source of pressurized fluid mounted in a thermo-forming machine.

Referring now to FIG. 6, the prime mover 54 may also include a source of pressurized fluid 74 that is operatively connected to the motor 64 via conduits 76, or the like. In one embodiment, the pressurized fluid may be used to drive the motor 64. Importantly, the prime mover 54 is operable even in the event of a power outage, mechanical failure, or operator error.

In one embodiment, the motor 64 includes a pneumatically actuated motor and the source of pressurized fluid includes a reservoir 74 in fluid communication with the pneumatically actuated motor 64 via the conduits 76. The reservoir 24 contains air under pressure. However, those having ordinary skill in the art will appreciate that the motor 64 may be electrically, or otherwise powered, and that the source of pressurized fluid may be located remotely from the thermo-forming machine 20.

Alternatively, those having ordinary skill in the art will appreciate from the description of the present invention that the prime mover 54 may include any number of devices which act to move the barrier from its stowed to its deployed position. Thus, instead of an electrically or mechanically powered motor, the prime mover may simply include a piston cylinder arrangement wherein actuation of the barrier 52 from its stored to its deployed position is effected by the retraction of the cylinder. Moreover, the examples illustrated and described herein are not presented as a means of limiting the scope of the prime mover 54. Rather, they are described herein to clearly illustrate that the prime mover 54 may include any number of mechanisms or drive systems that function to move the barrier from its stored to its deployed position. Indeed, the barrier 52 may be moved from its stored to its deployed position manually by the operator of a thermo-forming machine.

OPERATION

At the start of a thermo-forming operation, the clamp frame 42 is initially disposed so that the operator may mount the workpiece W within the clamp frame 42. In this way, the edges of the workpiece are fixed in the clamp frame 42. The clamp frame 42 is then indexed so that the workpiece W is positioned between the upper and lower sections 24A and 24B of the oven 24 for a predetermined amount of time and until it has become sufficiently plasticized. Once the workpiece has become sufficiently plasticized, the clamp frame 42 is indexed so as to be positioned between the upper die 28 and the lower mold member 32. The die 28 and mold member 32 are brought into mating engagement as the upper and lower platens 30, 34 are moved toward one another thereby imparting a contoured shape to the workpiece W. At the same time, and in the case of a vacuum actuated die, the workpiece W is drawn toward the surface of the die. The newly formed part is allowed to "set up" or cool. The upper and lower platens 30, 34 are then moved away from one another, the part is removed from the machine and the process is repeated.

In the event of a predetermined condition, such as an emergency stop command, a power outage, mechanical failure, electrical failure, operator error, or any other situation that causes the workpiece to sag toward the lower section 24B of the oven 24, the controller 56 may receive a signal to initiate the oven protection system 50. In this event, pneumatic power is then automatically supplied from the reservoir 74 to the motor 64 to drive the spindle 68. The spindle 68 is operatively connected to the barrier via, for example, the cable 70. Rotation of the spindle 68 coils the cable thereabout and actuates the barrier 52. In this way, the barrier 52 is moved from its stored position spaced above and adjacent the lower section 24B of the oven 24 to its deployed position between the workpiece W and the oven 24. The barrier 52 prevents the workpiece from coming into contact with the oven 24. More specifically, the barrier 52 prevents the plasticized workpiece from dripping into the oven, fouling the elements, or otherwise causing smoke, noxious fumes, or a fire in the oven. In short, because of the actuation of the barrier 52, the workpiece W will not burn to the extent that it generates fumes, fire, or smoke. Thus, the oven protection system of the present invention allows normal cycling procedures in a thermo-forming machine to occur unimpeded, but, at the same time, prevents the workpiece from coming into contact with the oven when, for example, it becomes overly plasticized.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. An oven protection system for a thermo-forming machine having a source of heat for heating a workpiece, said oven protection system comprising:
a barrier movable from a stored position to a deployed position, wherein said barrier includes a flexible material disposed upon a roll in said stored position laterally spaced relative to the source of heat and extending in a sheet-like fashion when disposed in said deployed position so that it is located beneath the workpiece and above the source of heat to prevent the workpiece from coming in contact with the source of heat in response to a predetermined condition.

2. An oven protection system as set forth in claim 1 further including a prime mover operatively connected to said barrier and adapted to move said barrier from said stored to said deployed position.

3. An oven protection system as set forth in claim 2 further including a controller and a sensor operatively mounted to the thermo-forming machine and adapted to sense a predetermined condition and to send a signal to said controller, said controller operable to actuate said prime mover to move said barrier from said stored position to said deployed position.

4. An oven protection system as set forth in claim 1 wherein said flexible material includes a sheet of foil-faced fiberglass.

5. An oven protection system as set forth in claim 2 wherein said prime mover includes a motor having an output and a spindle operatively connected to said motor, said motor operable to drive said spindle.

6. An oven protection system as set forth in claim 5 wherein said prime mover further includes a cable operatively connected between said spindle and said barrier and operable to be wound about said spindle to move said barrier from said stored to said deployed position as said motor drives said spindle.

7. An oven protection system as set forth in claim 5 wherein said prime mover further includes a source of pressurized fluid operatively connected to said motor, said pressurized fluid used to drive said motor.

8. An oven protection system as set forth in claim 7 wherein said motor includes a pneumatically actuated motor, said source of pressurized fluid including a reservoir in fluid communication with said pneumatically actuated motor and containing air under pressure.

9. An oven protection system as set forth in claim 3 wherein said sensor is a photoelectric sensor adapted to sense when the workpiece has become overly plasticized in response to heat from the source of heat.

10. An thermo-forming machine comprising:
an oven providing a source of heat for heating a workpiece;
an oven protection system including a barrier movable from a stored position to a deployed position, wherein said barrier includes a flexible material disposed upon a roll in said stored position laterally spaced relative to the oven and extending in a sheet-like fashion when disposed in said deployed position so that it is located beneath the workpiece and above the oven to prevent the workpiece from coming in contact with the oven in response to a predetermined condition.

11. A thermo forming machine as set forth in claim 10 further including a prime mover operatively connected to said barrier and adapted to move said barrier from said stored to said deployed position.

12. A thermo forming machine as set forth in claim 11 further including a controller and a sensor operatively mounted to the thermo-forming machine and adapted to sense a predetermined condition and to send a signal to said controller, said controller operable to actuate said prime mover to move said barrier from said stored position to said deployed position.

13. A thermo forming machine as set forth in claim 10 wherein said flexible material includes a sheet of foil-faced fiberglass.

14. A thermo forming machine as set forth in claim 11 wherein said prime mover includes a motor having an output and a spindle operatively connected to said motor, said motor operable to drive said spindle.

15. A thermo forming machine as set forth in claim 14 wherein said prime mover further includes a cable operatively connected between said spindle and said barrier and operable to be wound about said spindle to move said barrier from said stored to said deployed position as said motor drives said spindle.

16. A thermo forming machine as set forth in claim 14 wherein said prime mover further includes a source of pressurized fluid operatively connected to said motor, said pressurized fluid used to drive said motor.

17. A thermo forming machine as set forth in claim 16 wherein said motor includes a pneumatically actuated motor, said source of pressurized fluid including a reservoir in fluid communication with said pneumatically actuated motor and containing air under pressure.

18. A thermo forming machine as set forth in claim 12 wherein said sensor is a photoelectric sensor adapted to sense when the workpiece has become overly plasticized in response to heat from the source of heat.

* * * * *